United States Patent

[11] 3,608,587

[72] Inventor Richard P. Zbell
 Birmingham, Mich.
[21] Appl. No. 847,941
[22] Filed Aug. 6, 1969
[45] Patented Sept. 28, 1971
[73] Assignee Ross Operating Valve Company
 Detroit, Mich.

[54] SINGLE SPINDLE FOUR-WAY VALVE
 3 Claims, 2 Drawing Figs.
[52] U.S. Cl. .................................................. 137/625.66,
 251/77, 251/84, 137/625.27
[51] Int. Cl. ...................................................... F16k 11/02,
 F16k 25/00
[50] Field of Search ............................................. 251/77, 84,
 86; 137/625.67, 625.66, 625.25, 625.26, 625.27

[56] References Cited
 UNITED STATES PATENTS
2,969,045 1/1961 Clar .............................. 137/625.65

| 2,969,775 | 1/1961 | Thelen | 137/625.27 |
| 3,294,120 | 12/1966 | Ruchser | 137/596.16 X |
| 3,452,781 | 7/1969 | Napolitano | 137/627.5 |
| 3,478,781 | 11/1969 | McLaughlin | 137/625.63 |

FOREIGN PATENTS

| 1,309,819 | 10/1962 | France | 137/625.27 |
| 27,121 | 11/1910 | Great Britain | 137/625.27 |

Primary Examiner—Henry T. Klinksiek
Attorney—Harness, Dickey & Pierce

ABSTRACT: A housing has a bore with two working ports separated by an inlet port, two exhaust ports being located outside of the working ports. A spindle has a constant force applied to one end and signal pressure at the other end. Two oppositely facing poppet valves carried by the spindle engage seats disposed between the exhaust ports and the working ports. A third valve element carries two oppositely facing poppet valves engaging seats between the working ports and the inlet port. This last-mentioned element has slight play with respect to the spindle.

INVENTOR.
Richard P. Zbell
BY Harness, Dickey & Pierce
ATTORNEYS.

SINGLE SPINDLE FOUR-WAY VALVE

BACKGROUND OF THE INVENTION

1. Field of the Invention

The invention relates to four-way valves which will supply either of two working ports and exhaust the other. More particularly, the invention relates to single spindle constructions for such valves.

2. Description of Prior Art

Various single spindle constructions have been used for four-way valves, but these involve either combination poppet and spool valves or poppet valves of a more complicated type. Examples of such valves are the following:

Norgren Goldenaire Line of four-way sub-base valves manufactured by Norgren of Littleton, Colo.

Valve No. SA-4502-71 manufactured by Versa Products Company, Inc., Brooklyn, N.Y.

Valve Nos. K032-243 and K032-244 manufactured by Bellows-Valvair, Akron Ohio.

Valve No. 26566 manufactured by Herion-Werke K-G, Stuttgart, Germany.

U.S. Pat. Nos. 2,703,106, 2,750,961, 2,768,509 and 3,176,719.

These constructions, however, have various deficiencies as compared with the present invention. Some of them have considerably more complicated constructions, and others require a large number of static seals. In the case of constructions using spool valves, care must be taken to avoid dislocation of the seals, especially if the working ports are of large volume.

BRIEF SUMMARY OF THE INVENTION

According to the invention, the valve body has a central bore and the ports extend laterally from this bore. The inlet port is centrally located and is surrounded by two working ports which are in turn surrounded by a pair of exhaust ports.

A spindle is movably mounted in the bore and has three valve elements carried thereby. The two outside valve elements comprise a relatively large piston which reacts to signal pressure and, in the illustrated embodiment, a relatively small piston which reacts to constant supply pressure although this might be replaced with a spring. These elements also carry poppet valves which engage seats disposed between the exhaust and working ports, the poppet valves facing each other.

A central portion of the spindle has a third valve element, this one carrying poppet valves which face away from each other. The valves engage seats between the working ports and the inlet ports, and this third valve element has some axial as well as rocking play with respect to the spindle.

DESCRIPTION OF THE PREFERRED EMBODIMENT

Figure 1:
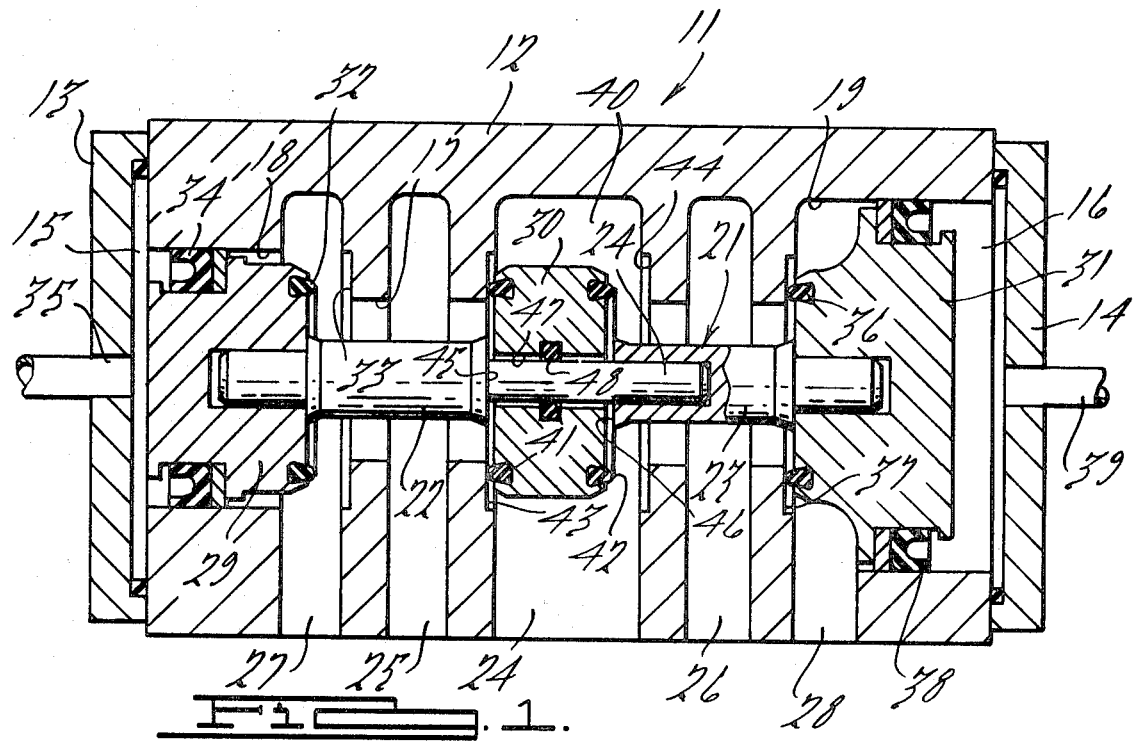
FIG. 1 is a cross-sectional view of the valve shown with one of the ports open to inlet and the other to exhaust.

The valve is generally indicated at 11 and comprises a valve body 12 with end plates 13 and 14 which form chambers 15 and 16, respectively. A bore 17 is formed in the valve body connecting the two chambers, the bore having enlarged end portions 18 and 19 adjacent chambers 15 and 16, respectively. Bore portion 19 is considerably larger in diameter than portion 18, so that chamber 16 is correspondingly bigger in size than chamber 15.

A valve spindle generally indicated at 21 is provided within bore 17. This spindle is shown as being made up of two parts 22 and 23 which are connected at 24a. The diameter of bore 17 is substantially larger than the diameters of members 22 and 23. A supply port 24 extends laterally from bore 17 to one side of the body. Two working ports 25 and 26 extend laterally from the body on either side of port 24 and are connected with bore 17. Two exhaust ports 27 and 28 are formed in body 12 and extend laterally from bore 17, the exhaust ports being disposed outwardly of working ports 25 and 26.

The connections between these ports is controlled by three valve elements 29, 30 and 31 carried by spool 21. Valve element 29 carries a valve seal 32 which engages a radial seat 33 disposed between ports 25 and 27 and facing port 27. This valve element also carries a seal 34 which fits within bore portion 18 to enclose chamber 15. This chamber is supplied with air under constant pressure by a port 35 so that spindle 21 will be constantly urged to the right in FIGS. 1 and 2. A spring could replace this constant pressure.

Element 31 carries a valve seal 36 which engages a radial seat 37 disposed between ports 26 and 28 and facing port 28. This element also carries a seal 38 fitting within bore portion 19 and therefore enclosing chamber 16. This chamber is subjected to signal pressure through a port 39.

Element 30 is disposed in a chamber 40 connected to inlet port 24 and carries valve seals 41 and 42 facing in opposite directions. These seals engage radial seats 43 and 44 respectively. Seat 43 is disposed between ports 24 and 25 and faces port 24 whereas seat 44 is disposed between port 24 and 26 and faces port 24. The effective diameter of seal 34 is greater than the effective diameter of seal 41 so that when signal pressure is removed in port 39, the pressure in chamber 15 will shift the spindle to the right.

Element 30 is loosely mounted on spindle 21 so that it has slight axial play between shoulders 45 and 46 and also is permitted a slight rocking motion because its bore 47 is slightly larger than the adjacent diameter of spindle 21. A seal 48 is disposed within element 30 and engages spindle 21.

Figure 2:
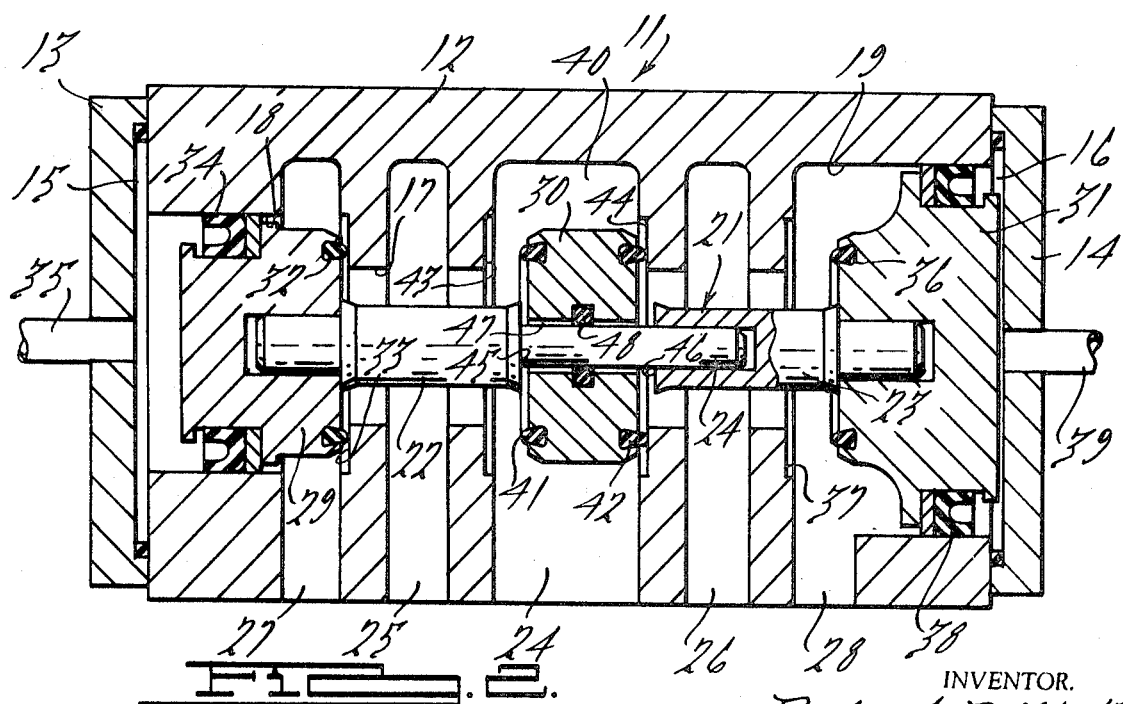
FIG. 2 is the same cross section with the valve shifted to the other position.

The diameter of seals 32, 36, 41 and 42 is the same, and the effective area of seal 38 is greater than that of seal 34 plus seal 42, so that signal pressure in chamber 16 will be able to shift the valve from the FIG. 2 position to that of FIG. 1.

In operation, assuming an initial position of the valve as shown in FIG. 1, with signal pressure applied to port 39 and constant pressure applied to port 35, working port 26 will be connected to supply port 24, whereas working port 25 will be connected to exhaust port 27.

Removal of signal pressure at port 39 will cause the pressure in chamber 15 to shift spindle 21 to the right. The spindle will arrive at the FIG. 2 position, thus connecting working port 25 to supply port 24 and working port 26 to exhaust port 28.

It will be noted that valve 11 is made up of relatively few parts and in particular, no inserts or static seals are needed in the valve body. Moreover, since spindle 21 is relatively light, the valve will respond quickly to changes in signal pressure.

I claim:

1. In a four-way valve, a valve body having a central inlet port, a pair of working ports on opposite sides of said inlet port and a pair of exhaust ports on the outsides of said working ports, a bore in said valve body, a valve spindle extending through said bore, said valve spindle having three valve elements carried thereby, one of said valve elements carrying a poppet-type seal at one end thereof engageable with a seat disposed between one of the working ports and its adjacent exhaust port and facing said exhaust port, a second valve element carrying a poppet-type valve seal at one end thereof engageable with a seat disposed between the other working port and its adjacent exhaust port and facing said exhaust port, and a third valve element mounted in a chamber of the valve body connected to said inlet port, said third valve element being of unitary construction, having slight axial play with respect to the spindle and carrying a pair of oppositely facing poppet-type seals engageable with seats disposed between the inlet port and the two working ports and facing said inlet port, means constantly urging said spindle in a first direction in which one of the working ports is connected to the inlet port and the other working port is connected to its adjacent exhaust port, said last-mentioned means comprising a seal carried by said first valve element at the end opposite said poppet-type seal and fitting in a bore portion in said valve body to form a chamber, means for pressurizing said last-mentioned chamber, means for selectively counteracting said constant urging means and shifting said valve to a second position in which the first-mentioned working port is connected to exhaust and the second-mentioned working port is connected to the inlet port, said last-mentioned means comprising a seal carried by said second valve element at the end opposite said poppet-type seal and fitting in a bore in a second bore portion of said valve body to form a chamber therewith, and means for applying signal pressure to said last-mentioned chamber.

2. The combination according to claim 1, the effective areas of said poppet-type valve seals being the same, the effective area of said seal forming the constant pressure chamber being larger than the effective area of any one of said poppet-type valves, the effective area of said seal forming the signal chamber being greater than the combined areas of any one of the poppet-type valve seals and said seal forming the constant urging means chamber.

3. The combination according to claim 2, said spindle having a pair of shoulders between which said third valve element is disposed, the spindle passing through a bore in said third valve element, said last-mentioned bore having a slightly larger diameter than the spindle to permit slight rocking of the third valve element, and an annular seal carried within the bore of said third valve element and engageable with said spindle.